Nov. 4, 1952  L. S. LEWIS  2,616,722
WELTING FOR FENDERS AND THE LIKE
Filed April 15, 1950
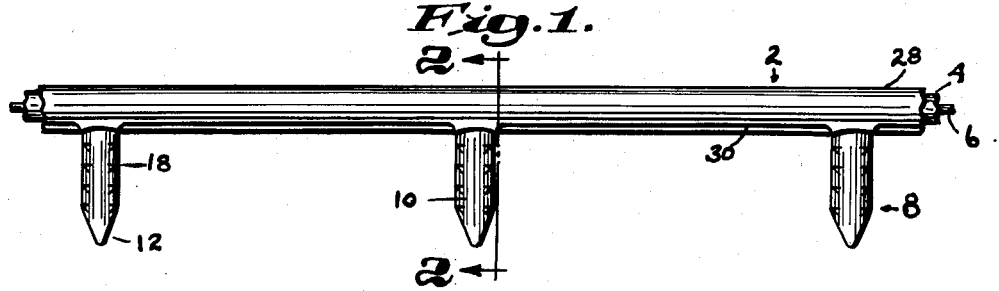
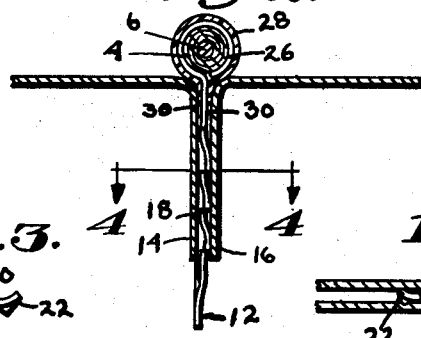
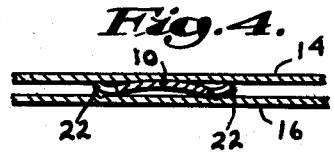
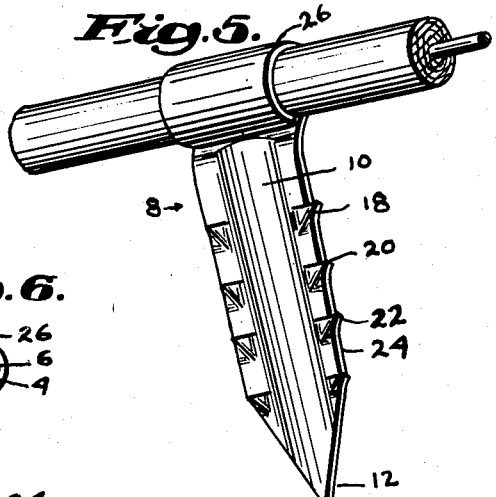
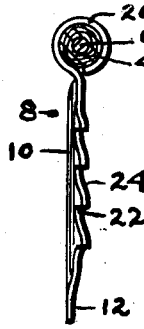
Inventor:
Louis S. Lewis,
by Arnold C. Rood
Attorney Patented Nov. 4, 1952

2,616,722

UNITED STATES PATENT OFFICE 2,616,722

WELTING FOR FENDERS AND THE LIKE

Louis S. Lewis, Winthrop, Mass., assignor to Marson Corp., Revere, Mass., a corporation of Massachusetts Application April 15, 1950, Serial No. 156,171

7 Claims. (Cl. 280—153.5)

This invention relates to fender welting, and more particularly to fender welting of improved and advantageous construction.

In the maintenance and repair of automotive vehicles, it is often necessary to replace the fender welting. This is costly in labor if the fenders have to be removed or loosened from the body and frame parts to which they are secured, for the introduction therebetween of new welting.

An object of this invention is to provide a fender welting which may be readily attached to an assembly of fender and body or frame of an automotive vehicle. Another object is to provide a fender welting suitable for the replacement of worn or damaged fender welting in automotive vehicles. A further object is to provide a fender welting of the above type which will provide improved protection against wear, weather, and corrosion to the welted automotive members.

In accordance with the above and other objects there is provided by this invention a form of welting which may be quickly positioned in place between already assembled fender and body parts and which is firmly retained in said position. The welting is of durable construction, sufficiently flexible to be given any desired curvature, and capable of holding that shape without stretching or cracking during the life of the automotive vehicle. This welting includes clips secured to the welting strip proper which are readily insertable between the fender and body parts to hold the welting tightly in place. It also includes a covering of material particularly adapted for application and imparting improved protection to the welting and to the welted metal members. As will be described in detail hereinafter, this covering serves to protect the welting and to conceal the attached clips from view, and in addition by a downward extension thereof, to protect the surfaces of fender and body parts adjacent to the opening filled by the welting proper and to conceal any corrosion which already may be present there. These features are obtained by the use of a suitable plastic, preferably in sheet form, such, for example, as polyvinyl chloride wherein a polymeric plasticizer is employed such, for example, as one of the alkyd resin types known commercially as "Paraplex" resins or a butadiene-acrylonitrile co-polymer, which plasticizers do not bleed and hence have little if any deleterious effect on the usual automotive fenders. Polyvinyl films or sheets of this type are thermoplastic, and therefore are particularly adapted for forming the particular construction of the protective covering since the edges of the sheet need only to be drawn together beneath the welting proper and simply heat sealed together to form the depending protective fin.

It will be apparent that the use of this type of covering imparts improved qualities to the welting. It is especially wear resistant and weather-resistant, not subject to mildew with loss of its physical properties, and is so applied that the welting proper is protected from such injurious effects. It is inert chemically with respect to automotive finishes and metal, and is capable of being fused into an integral unsupported structure without the use of adhesives and possible separation due to weathering, and remains flexible for the life of the fender without cracking.

A preferred embodiment of this invention is shown in the accompanying drawings in which:

Figure 1 is a lateral view of a longitudinal portion of a welting according to this invention;

Fig. 2 is a cross-sectional view of the welting taken on line 2—2 of Fig. 1 showing the welting disposed between a fender and a body member;

Fig. 3 is an enlarged view showing a clip member in lateral cross-section;

Fig. 4 is an enlarged view taken on line 4—4 of Fig. 2 showing the adjustable engagement of a clip member with the opposing surfaces of a fender and a body member;

Fig. 5 is an enlarged view in perspective showing the attachment of a clip member and showing the detail of the edge serrations; and Fig. 6 is a side view of an attached clip member showing the oblique projection of the edge serrations.

In the embodiment illustrated in the drawings, a welting 2 is shown having a body portion 4 provided with reinforcing member 6, said members 4 and 6 forming a core therein. Body portion 4 may comprise any suitable material for providing a resilient welt, and suitably this material may comprise fibrous cellulose material and preferably may be paper cording such as kraft paper cord. The reinforcing member suitably may be a copper wire, possessing sufficient flexibility to enable the welting 2 to be bent readily to conform to the curvature of the fender joint to which it is applied, and imparting sufficient strength to enable it to hold its shape, once bent, and to limit any stretch thereof. A core having a diameter substantially of $11/32''$ has been found suitable.

Clips 8 are shown secured to the core 4 at intervals along its length to provide means for holding said welting firmly to the fender-body joint. These clips are secured with their lateral axes in the same plane as the longitudinal axis of the welting. The clips 8 are spaced sufficiently close together to hold the welting in place without buckling, and to permit any clip contacting a bolt to be cut off without loosening effect.

The clips 8 suitably may be stamped out from sheet metal and shaped. These are shown having a depending arcuate prong 10 in which the side edges are displaced to one side of the vertical axis of the clip and the curved median portion of the clip is displaced outwardly to the other side of said vertical axis. The prong 10 is shown also shaped to provide a pointed end 12 for facilitating the introduction of body portion 10 between the assembled fender 14 and body member 16. The prong 10 is shown further provided with edge serrations 18. These edge serrations 18 obtain from horizontal notches 20, formed by slashing the outer margins of the prong 10 and bending back the outer marginal portions immediately beneath the slashes thus producing a projection 22 at the top of each marginal slashed section 24.

The prongs 10 when introduced between the assembled fender 14 and body part 16 (Fig. 2) will adjustably engage the abutting surfaces due to the spreading of the arcuate lateral surfaces (Fig. 4) and the edge serrations 18 will engage any extraneous material which may be between the abutting surfaces, such as may have resulted from corrosion or the deterioration of original welting, and further engagement of the arcuate body portion therebetween. The particular configuration given the serrations 18 enables the prongs 10 to be readily introduced because of the gradual upwardly outward bend of the marginal sections 24 but removal other than forcible, is obstructed by the projections 22, extending backwardly from the lower edge of the marginal section 24 adjacent above, bearing against any extraneous material and locking said body portion thereagainst.

Each clip has a core-encircling clamping head 26 by which to secure the clip to the said reinforced core. This head is shown in Figs. 2 and 5 and 6, bent snugly around core 4 of the welting with the flat end abutting the lower section thereof adjacent to the top of prong 10 to secure the clip thereon.

A covering 28 is provided for the clip-attached, reinforced welt body. The covering 28 is preferably formed of a sheet of a suitable plastic material, such, for example, as polyvinyl chloride which is plasticized with Paraplex G-50. This covering 28 is shown (Figs. 1 and 2) wrapped around the core 4 with the lateral edges projecting downwardly beneath said core and beyond the junction of the clamping head 26 with the prong 10. Thus the clip attachment is protected. Between the spaced clips, the projecting edges of the covering 28 are heat-sealed together to form a cover projection or fin 30. This cover projection or fin 30 engages the space between the fender 14 and body parts 16 and serves to hold the welting in position and in addition to seal the joint and hide any corrosion already present.

The embodiment just described finds particular use as replacement welting. For such use it is necessary only to rip out the old original welting and apply this replacement welting by progressively forcing the clips spaced along the length of the welting into the fender joint. This conveniently may be accomplished by driving the welting in with a hammer and a suitably shaped block. In old assemblies, a screw driver advantageously may be used to initiate separation of joined members where the clips are to be inserted. Because of the improved protective qualities and durability of this type of welting, it also may be used advantageously as original welting.

Having described my invention, what I claim as new and desire to secure by Letters Patent of the United States is:

1. Fender welting comprising, in combination, a flexible longitudinal core, clips surrounding said core at spaced intervals, each said clip carrying an arcuate barbed prong shaped to permit entry of the prong between a fender and another automotive member and to oppose withdrawal therefrom, and a plastic covering surrounding the core and extending in the direction of the prongs in the form of a fin and heat sealed along the fin.

2. Fender welting comprising, in combination, a flexible longitudinal core, clips surrounding said core at spaced intervals, each said clip carrying an arcuate prong shaped to permit entry of the prong between a fender and another automotive member, and a heat-sealed polymer-plasticized polyvinyl chloride covering surrounding the core and extending in the direction of the prongs in the form of a fin.

3. Fender welting comprising, in combination, a flexible longitudinal core, clips surrounding said core at spaced intervals, each said clip carrying an arcuate barbed prong shaped to permit entry of the prong between fender and another automotive member and to oppose withdrawal therefrom, and a heat-sealed, polymer-plasticized polyvinyl chloride covering surrounding the core and extending in the direction of the sprongs in the form of a fin.

4. Fender welting suitable for application to already assembled automotive members comprising, in combination, a flexible elongated core possessing sufficient resiliency and strength to assume and retain the contour of assembled automotive members, metal clips secured around said core at spaced intervals, each said clip carrying a depending arcuate prong pointed at its outer end to permit entry and spreading of said arcuate prong between fender and another automotive member and having its longitudinal edges provided with serrations to oppose withdrawal of said prong, and a plastic covering surrounding the core and extending in the direction of the prongs in the form of a fin and heat sealed along the fin.

5. Fender welting comprising, in combination, a flexible longitudinal core including a cord of cellulosic material containing a flexible reinforcing wire, metal clips secured around said core at spaced intervals, each said clip having a portion surrounding said core and an arcuate prong depending therefrom, said arcuate prong being pointed at its outer end to facilitate entry and spreading of said arcuate prong between a fender and another automotive member and having its longitudinal edges provided with serrations arranged to permit entry of said prong between said fender and automotive member but to oppose withdrawal therefrom, and a heat-sealed polymer-plasticized polyvinyl chloride covering surrounding the core and extending in the direction of the prongs in the form of a fin.

6. Fender welting comprising, in combination, an elongated core including a cord of paper material reinforced with a flexible wire, clips surrounding said core at spaced intervals, each said clip carrying an arcuate barbed prong shaped to permit entry of the prong between a fender and another automotive member and to oppose withdrawal therefrom, and an alkyd resin-plasticized polyvinyl chloride sheet covering surrounding the core and extending in the direction of the prongs, the lower edges of the covering being heat-sealed together to form a fin.

7. Fender welting suitable for application to already assembled fender and automotive member, comprising, in combination, an elongated core including a cord of paper material reinforced with a flexible wire, metal clips secured to said core at spaced intervals, each said clip having an upper portion attachably surrounding said core and an arcuate prong portion depending from said core, said arcuate prong portion having converging lower edges to facilitate entry and spreading of said arcuate surfaces between an assembled fender and automotive member and having the edges thereabove provided with serrations arranged to permit the entry of said arcuate prong portion and to oppose withdrawal therefrom, and a heat-sealed alkyd resin-plasticized polyvinyl chloride sheet covering surrounding the core and extending in the direction of the prongs, the lower edges of the covering being heat-sealed together to form a fin.

LOUIS S. LEWIS.

REFERENCES CITED

The following references are of record in the file of this patent:

UNITED STATES PATENTS

| Number | Name | Date |
|---|---|---|
| 949,570 | Harris | Feb. 15, 1910 |
| 1,808,259 | Schemmel | June 2, 1931 |
| 2,377,169 | Mohr | May 29, 1945 |
| 2,416,798 | Ferguson | Mar. 4, 1947 |
| 2,483,622 | Burski | Oct. 4, 1949 |
| 2,491,923 | Johnson | Dec. 20, 1949 |
| 2,523,223 | Martin | Sept. 19, 1950 |

FOREIGN PATENTS

| Number | Country | Date |
|---|---|---|
| 586,826 | Great Britain | Apr. 1, 1947 |

OTHER REFERENCES

Chem. and Engineering News, vol. 26, No. 10, March 8, 1948, page 719, article on "Paraplex G-50."